United States Patent [19]

Müller et al.

[11] Patent Number: 4,903,590

[45] Date of Patent: Feb. 27, 1990

[54] APPARATUS FOR INJECTING LIQUID INTO PIECES OF FOOD

[75] Inventors: Frank Müller, Copenhagen; John Nielsen, Store Heddinge, both of Denmark

[73] Assignees: Fomaco Food Machinery Company A/S, Copenhagen; Stevns Maskinfabrik ApS, Heddinge, both of Denmark

[21] Appl. No.: 214,678

[22] Filed: Jul. 1, 1988

[30] Foreign Application Priority Data

Jul. 3, 1987 [DK] Denmark ............................. 3437/87

[51] Int. Cl.$^4$ .......................... A22C 17/00; A23L 1/31
[52] U.S. Cl. .......................................... 99/487; 17/51; 99/533; 99/535; 426/281
[58] Field of Search .................. 426/281, 652; 99/487, 99/532, 533, 535, 516; 17/51, 25

[56] References Cited

U.S. PATENT DOCUMENTS

| | | | |
|---|---|---|---|
| 3,863,556 | 2/1975 | Townsend | 99/487 |
| 3,922,357 | 11/1975 | Townsend | 99/533 |
| 4,142,000 | 2/1979 | Townsend | 426/281 |
| 4,220,669 | 9/1980 | Townsend | 426/281 |
| 4,487,119 | 12/1984 | Townsend | 99/487 |

FOREIGN PATENT DOCUMENTS

| | | |
|---|---|---|
| 2526929 | 2/1976 | Denmark . |
| 3119466 | 2/1982 | Denmark . |
| 3211037 | 3/1982 | Denmark . |
| 3509158 | 9/1986 | Fed. Rep. of Germany ...... 426/281 |
| 2345934 | 10/1977 | France . |
| 2181035 | 4/1987 | United Kingdom . |

Primary Examiner—George Yeung
Attorney, Agent, or Firm—Merchant, Gould, Smith, Edell, Welter & Schmidt

[57] ABSTRACT

Brine, pickle or another liquid is injected into a piece of food through groups of hollow needles, which are plunged into various parts of said piece of food. Different amounts of liquid are injected through said groups of needles in dependency of estimated liquid absorbing characteristics of the respective parts of the piece of food, so as to obtain a substantially uniform distribution of the brine or liquid therein. Pressurized liquid may be supplied to each group of needles from a common source through a liquid valve, and the amount of liquid injected into the various parts of the piece of food may then be controlled by controlling the pressure of the liquid supplied to said group of needles by adjusting the valve. Such adjustment may be controlled by an electronic control device comprising a micro processor.

13 Claims, 4 Drawing Sheets

APPARATUS FOR INJECTING LIQUID INTO PIECES OF FOOD

FIELD OF THE INVENTION

The preparation of food products may comprise injection of brine, pickle or other liquids into pieces of food, such as pieces of meat, vegetables, fruits, and other pieces of food.

The present invention relates to a method of injecting liquid into such pieces of food through groups of hollow needles.

DESCRIPTION OF THE PRIOR ART

It is conventional to inject brine into hams and other pieces of meat through hollow needles, which are plunged into the meat. However, even when the needles are uniformly spaced and equal amounts of brine is injected into the meat through the various needles it has been found that the brine is not uniformly distributed in each piece of meat. Consequently, in some parts of a ham or another piece of meat which has been processed by the known brine injection process described above, the concentration of brine is much higher than in other parts of the ham. This means that even when the average concentration of brine in the ham is of a desired value, the concentration of brine may be objectionably high in some parts of the ham and too low in other parts.

SUMMARY OF THE INVENTION

The present invention provides a method rendering it possible to obtain a more uniform distribution of brine, pickle, or other liquid, which is injected into a piece of food. It has been found that the reason why a less uniform distribution is obtained by the conventional method is that some parts of the meat or food which is processed is of a tissue structure being less inclined to absorb liquid than others, for example due to varying muscular or product density so that liquid injected into the less absorbing tissue structures tend to migrate to the more absorbing structures where the concentration of brine or liquid will become relatively high when liquid injection is uniformly distributed over the various structures.

Thus, the present invention provides a method of injecting a liquid into a piece of food through groups of hollow needles, which groups are plunged into various parts of said piece of food, said method comprising injecting different amounts of liquid through said groups of needles in dependency of estimated liquid absorbing characteristics of respective parts of the piece of food. This means that a higher amount of liquid is injected into parts or tissue structures of the piece of food having relatively poor liquid absorbing characteristics teristics than into the parts or structures having good liquid absorbing characteristics. Because of the tendency of migration of liquid from the first mentioned to the last mentioned parts or tissue structures, the method according to the invention makes it possible to obtain a more uniform final distribution of the liquid concentration in the piece of food than the distribution obtainable by the conventional method of injection.

The liquid absorbing characteristics of the various parts of each piece of food to be processed may be based on previous experiments or on empirical data previously obtained. Alternatively, it is possible to determine the liquid absorbing characteristics of the various parts of each piece of food immediately prior to the injection of liquid into the piece of food. The determination of the varying liquid absorbing characteristics of the piece of food may, for example, be made by determining the pattern of various tissue structures, such as fatty tissues and muscular tissues by ultra-sound scanning or by any other method for determining the various kinds of tissues.

Each needle group may comprise a plurality of needles arranged in any pattern in uniformly spaced relationship. In a borderline case, however, each needle group may comprise only a single needle or a pair of needles when it is desired to obtain a very finely differentiated distribution of the liquid in the piece of food in conformity with the varying tissue structures so as to obtain a final substantially uniform liquid distribution in the processed piece of food. In such case the supply of liquid to each single needle group is preferably controlled by means of a computer or another electronic control device in response to signals received from any type of scanning device which is able to detect the tissue pattern in the piece of food being processed.

The method according to the invention may principally be used for injecting a liquid of any type into pieces of food of any kind having varying liquid absorbing characteristics. In most cases, however, the method according to the invention is used for injecting brine, pickle or another taste improving and/or food preserving liquid substance into pieces of meat or into vegetables or fruits, such as cucumbers or pumpkins.

The hollow needles may extend from the outer peripheral surface of a roller, and pieces of food to be processed may then be moved continuously along a path of movement past the needle roller. In the preferred embodiment, however, the pieces of food are successively and intermittently moved along a path of movement, and an arrangement of said groups of needles extending across said path of movement are then moved into and out of engagement with said pieces of food in synchronism with said intermittent movement thereof.

Each group of needles may be in communication with its own source of pressurized liquid, and the liquid pressures of the respective sources may then be controlled so as to correspond to the amounts of liquid to be injected through the various groups of needles. In the preferred embodiment, however, the pressurized liquid is supplied to each group of needles from a common source through a liquid valve, and the amount of liquid injected is controlled by controlling the pressure of the liquid supplied to said group of needles by adjusting said valve.

The present invention also relates to an apparatus for injecting liquid into pieces of food and comprising means for intermittently transporting said pieces of food along a path of movement, an arrangement of hollow needles arranged in groups and positioned above said path of movement, means for moving said hollow needles into and out of penetrating engagement with said pieces of food in synchronism with the intermittent transport of the pieces of food, means for supplying pressurized liquid to said needles when they are in engagement with said pieces of food, and means for controlling the amount of liquid supplied to each group of needles. Thus, the supply of liquid to the various needle groups may be chosen in accordance with a program which has been predetermined for the specific kind of pieces of food being processed.

As mentioned above, a common pressurized liquid source may supply pressurized liquid to the various groups of needles, and the control means may then comprise pressure reducing means, such as pressure control valves associated with each of the needle groups, for independently reducing the pressure supplied to each of said needle groups. In such case, the operator may manually adjust the various control valves in accordance with empirical values which have been predetermined for the specific kind of pieces of food being treated.

In a preferred embodiment, however, the control means comprises an electronic control device for controlling the supply of liquid to the various groups of needles in accordance with a selected program. The operator may then depress a button and thereby select a program suitable for the specific food product to be treated. In order to ensure that the pressure reducing means or pressure control valves are set by the electronic control device so as to obtain the liquid pressures desired at the various needle groups, the control means may further comprise a pressure sensor associated with each needle group for sensing the actual pressure of the liquid supplied to the various groups and for transmitting a corresponding sensing signal to the electronic control device which is adapted to adjust the pressure of the liquid supplied to the respective groups in response to the sensing signals received.

In order to prevent unnecessary waste of liquid, the supply of liquid to the hollow needles should not start until the free ends of the needles have come into contact with the piece of food being processed, and the supply of liquid should stop when the free pointed ends of the needles have been moved out of engagement with the piece of food. Therefore, the apparatus according to the invention preferably comprises a closure valve associated with each group of needles for opening and closing the liquid supply to said group of needles when they are moved into and out of engagement, respectively, with the piece of food.

The liquid being injected may entrain air or gas which might make the food more perishable. Therefore it is important to prevent entrainment of air, and the closure valve may comprise venting means for separating entrained air or gas from the liquid supplied to the respective groups of needles.

Each group of needles may comprise an abutment member which is moved together with the needles by said moving means and which is moved in abutting engagement with the piece of food being treated while the needles are being plunged into the piece of food. Thus, the abutment member is further movable in relation to and along the needles from the free ends thereof against an oppositely directed spring bias. Thus, the abutment members are biasing the food pieces being processed against the surface forming the path of movement of the pieces of food also when the needles are retracted therefrom. When no pieces of food are moved through the apparatus, the abutment members will follow the reciprocating movements of the needles and are not moved in relation to these needles. Therefore, each abutment member may be used for controlling the position of the closure valve of the respective needle group, and the abutment member may be interconnected with the closure valve so as to open the valve when a predetermined length of the free end portions of the needles extends beyond the abutment member and so as to close the valve when the abutment member is positioned adjacent to the free ends of the needles, because the fact that a certain length of the free end portions of the needles extend beyond the abutment member indicates that the needles have penetrated into a piece of food.

In a preferred embodiment the needles are mounted on a common supporting member defining upper surface parts and through holes therein for receiving said needles, and the inlet end of each needle may then comprise a radially extending widening or flange portion engaging with one of said upper surface parts while a pointed outlet end of the needle extends from the opposite side of the supporting member. The flange portion of the needle in each group of needles may then be clamped between one of the upper surface portions and a liquid distributing member for distributing liquid to the various needles of the group. One or more of the needles in a group may then be replaced merely by removing the liquid distributing member in which the closure valve may be mounted. Further, a plurality of liquid distributing members for a corresponding number of needle groups may be pressed into sealing engagement with the inlet ends of the needles which may comprise sealing rings, by means of a common releasable pressure member. Any of the needles of this number of needle groups may then be replaced when the common pressure member has been demounted.

BRIEF DESCRIPTION OF THE DRAWINGS

The invention will now be further described with reference to the drawings, wherein.

DESCRIPTION OF A PREFERRED EMBODIMENT

Figure 1:
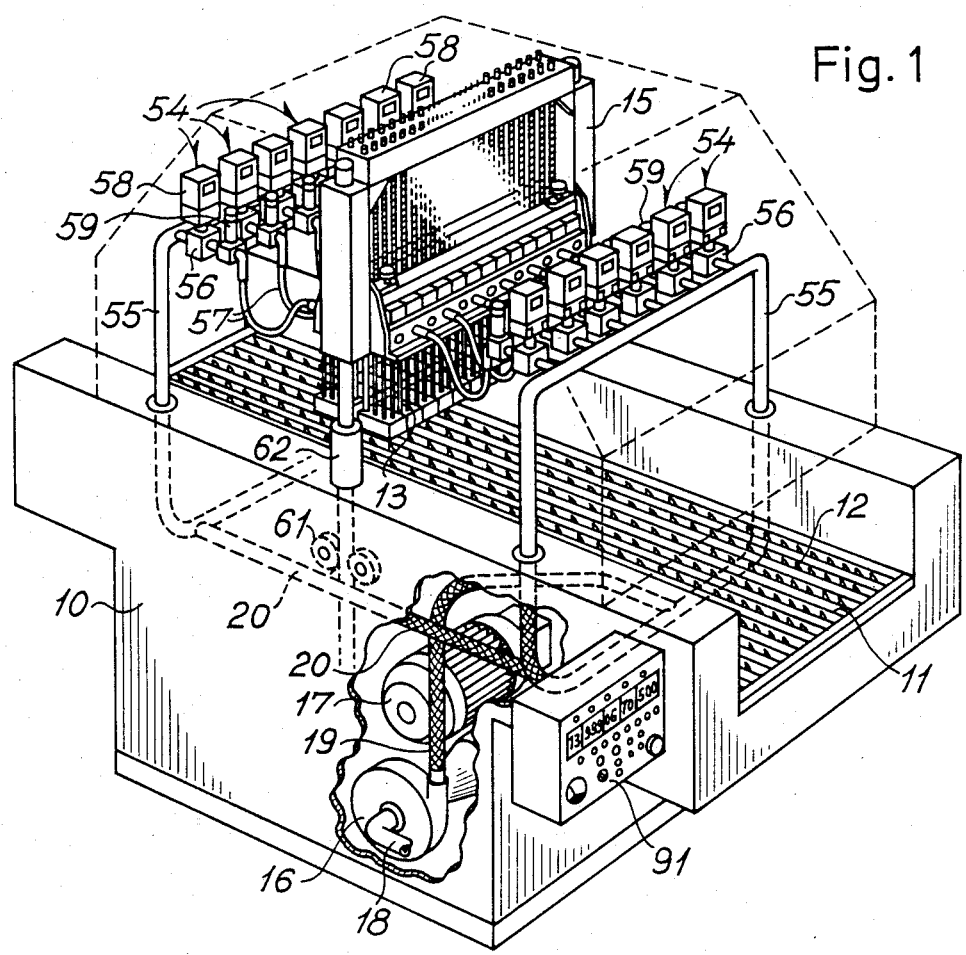
FIG. 1 is a perspective view of an embodiment of the apparatus according to the invention.

FIG. 1 shows an apparatus for injecting brine or edible animal or vegetable oils into pieces of meat, such as hams, necks of pork or other pieces of meat from pork or beef, fish filets, turkey, and other kinds of poultry. The apparatus comprises a frame 10 defining a longitudinally extending meat supporting surface 11. Pieces of meat to be processed may be placed on the supporting surface 11 manually or by suitable mechanical means in a desired pattern and with a certain orientation, and the pieces of meat may then be moved intermittently along the supporting surface by conveyor means 12 as will be described more in detail below. An arrangement of hollow needles 13 having pointed free ends with injection openings positioned above the meat supporting surface 11, is mounted on a bridge structure 15 which is reciprocatingly movable up and down together with the needles by means of a driving mechanism which will be further described below with reference to FIG. 2. Brine is delivered to each of the needles 13 by a pump 16 which is driven by a motor 17. The pump inlet 18 is connected to a suitable brine reservoir, not shown, and the outlet of the pump is connected to an outlet conduit 19 communicating with a manifold conduit system 20 for distributing the brine to the various needles 13.

Figure 3:
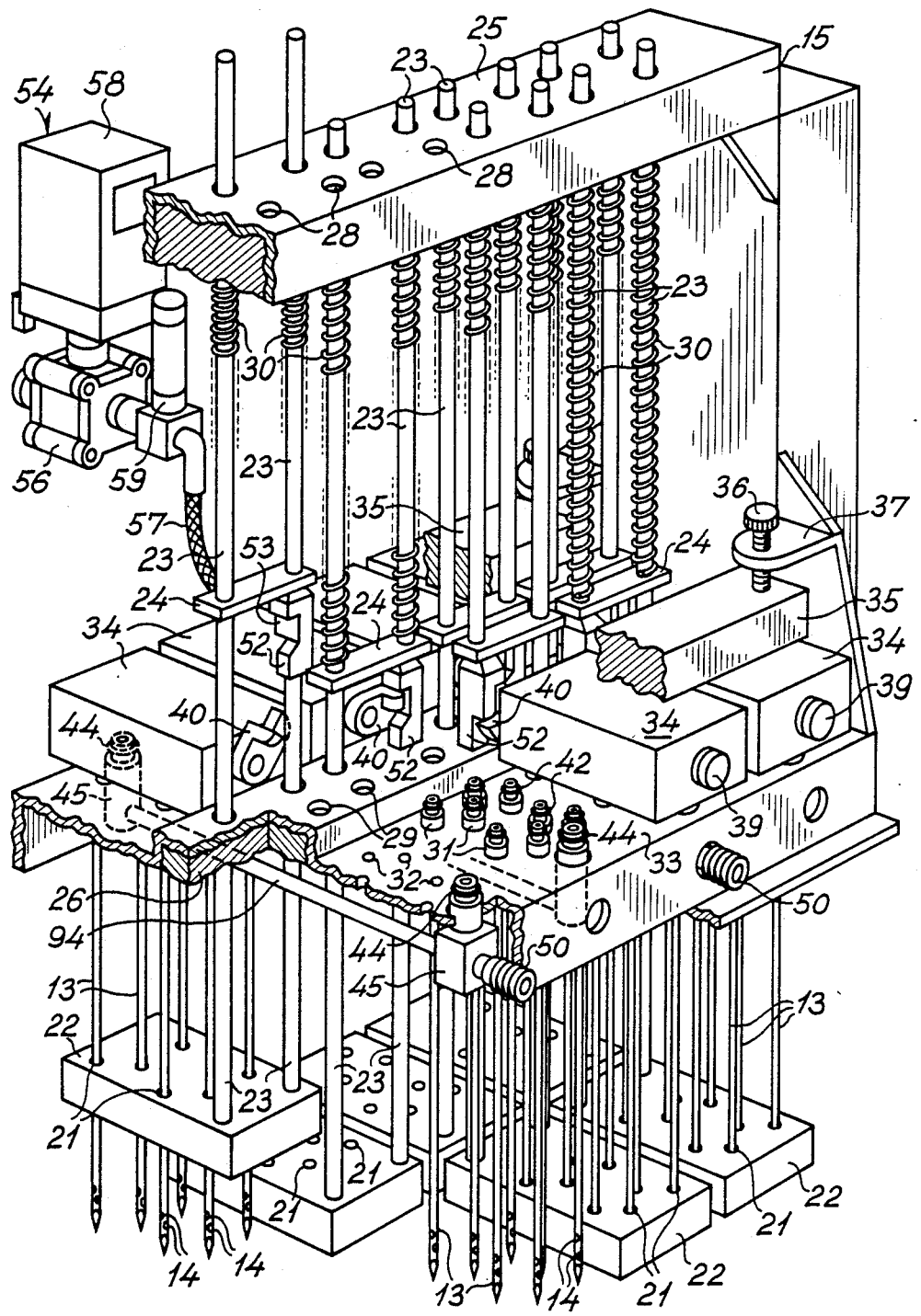
FIG. 3 is a perspective view with parts cut away for showing the needle arrangement and the valves controlling liquid supplied thereto more in detail.

As best shown in FIG. 3, the needles 13 are divided into a plurality of groups, and the needles 13 in each group is slidingly received in a number of through holes or bores 21 formed in an abutment block or plate 22. Each abutment plate 22 has a pair of upwardly extending guide rods 23 which are interconnected by a cross member 24. The bridge structure 15 comprises an upper beam 25 and a lower beam 26 of which the latter forms part of a needle supporting structure 27. Each of the guide rods extends slidably through aligned openings or bores 28 and 29 formed in the upper and lower beams 25 and 26, respectively. And the abutment plates 22 are biased towards a lower position by coil springs 30 encircling the guide rods 23 and having their opposite ends in engagement with the bottom surface of the upper beam 25 and the upper surface of the cross member 24, respectively.

A radially extending collar or flange 31 is formed at the upper end of each of the needles 13, and the needles have been inserted through openings or bores 32 formed in the needle supporting structure 27 on opposite sides of the lower beam 26, so that the collars or flanges 31 are in abutting engagement with upper, substantially plane surface parts 33 defined on the needle supporting structure 27. The upper open ends of the needles 13 in each group are covered by a liquid distributing block 34, and a row of such blocks 34 are pressed against the upper plane surface parts 33 by a bar member 35 which may be pressed into engagement with the top surfaces of the distributing blocks 34 by means of screws 36 mounted in projecting ears 37 formed on the bridge structure 15. Thus, the collars or flanges 31 of the needles 13 are clamped between the respective surface part 33 of the needle supporting structure 27 and the bottom surface of the respective distributing block 34, and any of the needles may be replaced simply by loosening the screws 36 and by thereafter removing the bar member 35 and the respective distributing block 34.

Figure 4:
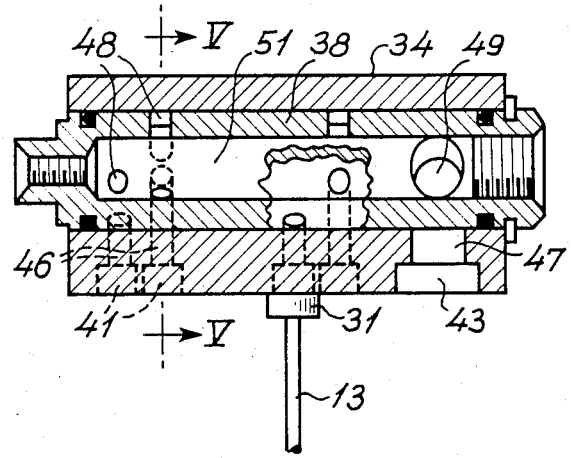
FIG. 4 is a longitudinal sectional view of a closure valve of the type opening and closing for supply of liquid to each group of needles.
Figure 5:
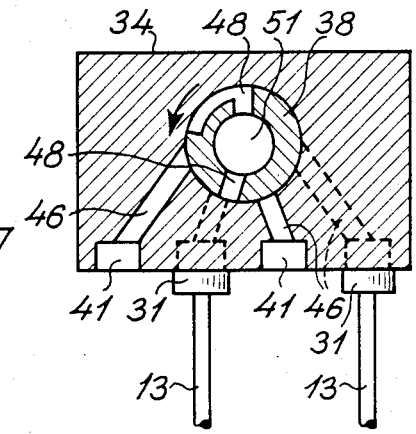
FIG. 5 is a cross-sectional view of the valve along the lines V—V in FIG. 4.

As shown in FIGS. 4 and 5 each liquid distributing block 34 contains a tubular closure valve member 38 rotatably mounted therein. The valve member 38 is internally threaded at both ends for mounting a screw plug 39 (FIG. 3) at one end and an actuating lever 40 at the other. As shown in FIGS. 4 and 5 a pattern of socket-like countersinking bores 41 corresponding to the arrangement of the needles 13 in each group and sealingly receiving the upper needle ends which project upwardly from the upper surface parts 33 and which may be surrounded by sealing rings 42 as best shown in FIG. 3. Each block 34 also defines a countersinking bore 43 for sealingly receiving a free end 44 of a liquid supply fitting 45 (FIG. 3). The countersinking bores 41 communicate with the space in which the valve member 38 is received, through connecting bores 46, and the countersinking bore 43 communicates with the same space through a connecting bore 47. A number of bores 48 corresponding to the number of connecting bores 46 extend through the peripheral wall of the valve member 38 in such positions that the bores 48 formed in the valve member 38 are registering with the connecting bores 46 in a certain angular, open position of the valve member 38. A bore 49 in the peripheral wall of the valve member 38 is also registering with the connecting bore 47 in the said open position of the valve member 38 which means that in this open position of the valve member a liquid supply stub 50 of the fitting 45 is in communication with each of the hollow needles 13 in the respective needle group through the inner space 51 of the valve member 38. The valve member 38 may be rotated between this open position and a closed position in which the communication between the tube stub 50 and the needles 13 is cut off, by rotating the valve by means of the lever 40.

Possible air or gas entrained with the brine or liquid injected through the inner space 51 of the valve member 38 may collect in the upwardly extending bores 48. Therefore, as shown in FIGS. 4 and 5, these bores may open into peripherally extending channels or grooves 48a formed in the outer cylindrical surface of the valve member 38. When the valve member 38 is rotated from its closed to its open position, these upwardly extending bores 48 are brought into communication with the corresponding connecting bores 46 through the channels or grooves 48a, before the associated needles 13 come into engagement with a meat piece, whereby the collected air or gas is expelled before the pointed free end of the needles penetrate into the meat pieces.

The closure valves 38 are used for automatically starting supply of brine to the respective groups of hollow needles 13 when the needles of a specific group have penetrated a certain distance into a piece of meat or food, and for automatically stopping supply of brine to the needles of a group when these needles have been or are about to be moved out of engagement with the meat or food. Each of the guide rods 23 includes a cam member 52 (FIG. 3) located immediately below the cross member 24. The lower position of the abutment plates 22 and of the associated guide rods 23 is defined by the cam members 52, because in this lower position the bottom end of the cam members 52 is in abutting engagement with the upper surface of the lower beam 26 and, furthermore, the free ends of the actuating levers 40 are received in cut-outs 53 formed in the cam members 52 so that the levers 40 are maintained in a substantially horizontal position corresponding to a closed position of the valve member 38. The free pointed end portions of the needles 13 of a group are received in the bores 21 of the abutment plate 22 or positioned adjacent to that plate when the plate 22 is in its lower position. When the bridge structure 15 is moved downwardly towards the meat supporting surface 11 together with the arrangement of needles 13 and abutment plates 22 mounted thereon, at least some of the abutment plates will come into abutting engagement with pieces of meat positioned on the supporting surface 11. When the downward movement of the bridge structure 15 continues, the needles 13 of the group will penetrate into the meat while further downward movement of the abutment plates 22 is prevented. This causes a relative upward movement of the abutment plates 22 and the guide rods 23 mounted thereon in relation to the needles 13 and the bridge structure 15 whereby the coil springs 30 are compressed. The upward movement of a guide rod 23 and of the cam member 52 mounted thereon causes rotation of the actuating lever 40 and of the valve member 38 associated therewith from its closed to its open position.

The pressure of the brine supplied by the pump 16 to the various liquid supply stubs 50 via the manifold conduit system 20 is controlled by a plurality of pressure control devices 54 which are mounted on upper portions 55 of the conduit system 20. Each control device 54 comprises a throttle valve 56 mounted on and communicating with one of the upper conduit portions 55 and communicating with one of the liquid supply stubs 50 for a needle group through a flexible hose 57, a step motor 58 for adjusting the setting of the valve 56, and a pressure sensor 59, such as a pressure transducer positioned downstream of the valve.

In the embodiment shown in the drawings each pair of oppositely arranged liquid supply fittings 45 are interconnected by a connecting conduit 94, so that liquid or brine is supplied at the same pressure to pairs of needle groups aligned along the path of movement of the meat pieces, because each of such pairs of needle groups have a common pressure control device 54.

Figure 2:
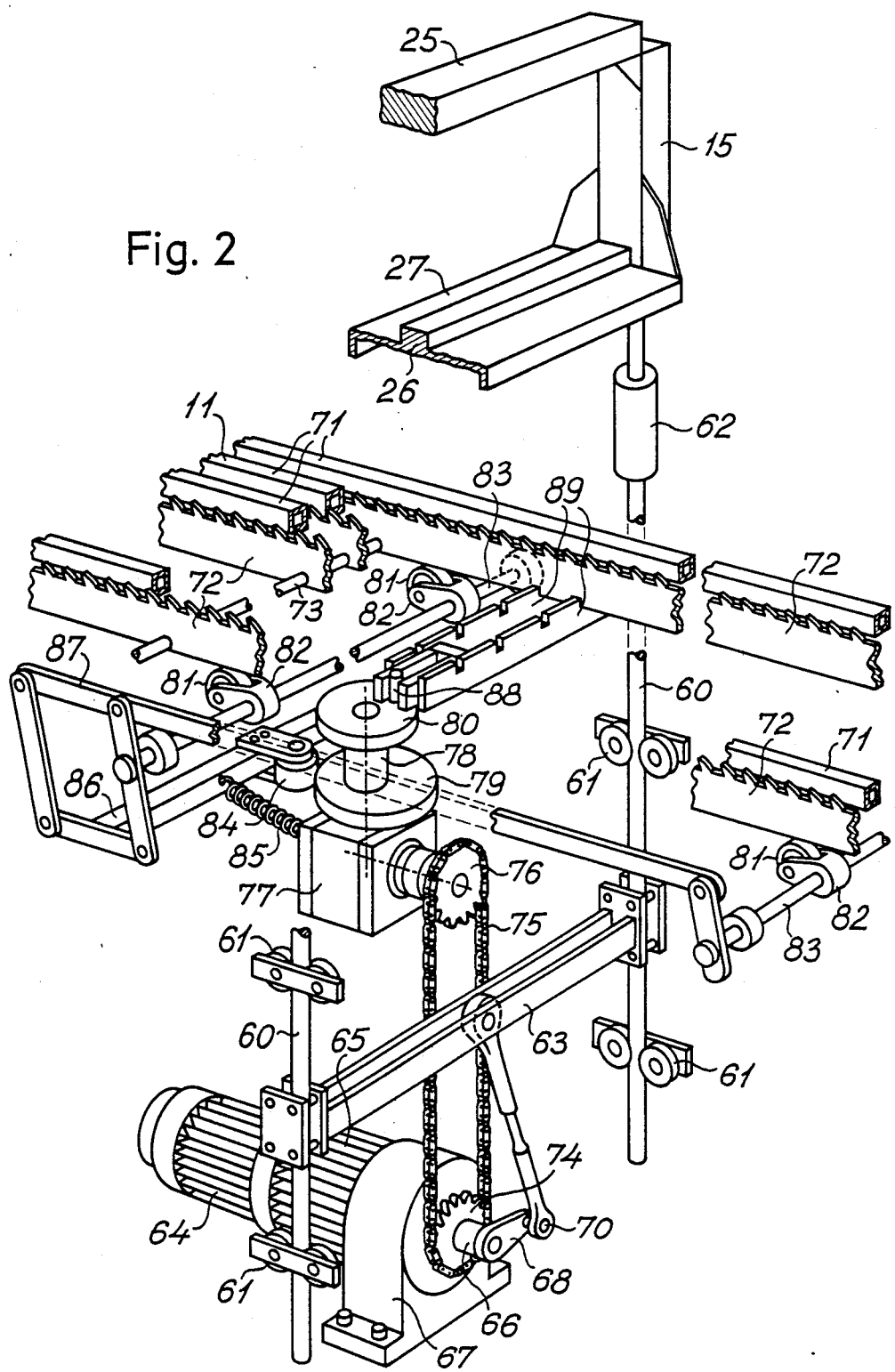
FIG. 2 is a perspective view where several parts have been cut away for showing the driving means of the apparatus on an enlarged scale.

The driving means for reciprocatingly driving the bridge structure 15 and for driving the conveyor means 12 will now be described with reference to FIG. 2. The bridge structure 15 comprises a pair of downwardly extending rods or legs 60 which are guided by pairs of guiding rollers 61 and guiding sleeves 62 so as to be movable up and down in their longitudinal direction in relation to the frame 10 of the apparatus on which the guiding rollers 61 are mounted. The lower free end portions of the rods 60 are interconnected by a double cross bar 63 which may be moved up and down by a driving motor 64 through a variator 65, gear box 67, a driving shaft 66, a crank arm 68 mounted on the driving shaft 66, and a connecting rod 69 having its opposite ends pivotally connected to an eccentric pin 70 of the crank arm 68 and the cross bar 63, respectively. It is understood that rotation of the crank arm 68 by energizing the motor 64 will cause a reciprocating upward and downward movement of the bridge structure 15 and of the groups of needles 13 mounted thereon.

The meat supporting surface 11 is defined by the upper surfaces of a plurality of parallel, spaced supporting bars 71 which extend in the longitudinal direction of the path of movement of the pieces of meat being processed. The conveyor means 12 for moving the pieces of meat along the meat supporting surface 11 comprises a plurality of spaced driving bars 72 having a serrated top surface and each being positioned between adjacent pairs of supporting bars 71. The parallel extending, spaced driving bars 72 are interconnected by rod shaped connecting members 73 so as to form an integral unit. The driving bars 72 are moved along a substantially rectangular path so as to intermittently move pieces of food along the supporting surface. Thus, the rectangular path of movement comprises a driving stroke while the serrated top surfaces of the driving bars 72 are positioned slightly above the level of the meat supporting surface 11, and a return stroke while the serrated top surfaces of the driving bars are located below the meat supporting surface 11.

The driving bars 72 are moved by the electric motor 64 through a chain and sprocket drive comprising a sprocket 74 mounted on the driving shaft 66, a chain 75 and a sprocket 76 mounted on an input shaft of a gear box 77. A substantially vertically extending output shaft 78 of the gear box 77 has an eccentric or a cam 79 mounted thereon. The level of the serrated upper surfaces of the driving bars 72 is determined by the level of supporting rollers 81, which are in abutting engagement with the lower surfaces of the driving bars 72 and which are rotatably mounted on arms 82 extending radially from shafts 83 rotatably mounted in the frame 10. A cam follower 84 which is maintained in engagement with the eccentric or cam 79 by a spring 85 is mounted on a cross bar 86 which is connected to the shafts 83 through a lever or link connection 87 so that the driving bars 72 are moved reciprocatingly upwards and downwards, when the eccentric or cam is rotated.

The shaft 78 also has a disc 80 with an eccentric pin 88 mounted thereon. The pin 88 is slidingly received between a pair of spaced cross bars 89 which are connected to the driving bars 72. Thus, rotation of the disc 80 causes a reciprocating forward and backward movement of the driving bars 72. Thus, energizing of the motor 64 causes movement of the driving bars 72 along a rectangular path through driving and return strokes so as to cause intermittent movement of meat pieces along a path of movement defined by the meat supporting surface 11 and simultaneous and synchronized upward and downward movements of the bridge structure and of the needles 13 and abutment plates 22 mounted thereon.

Figure 6:
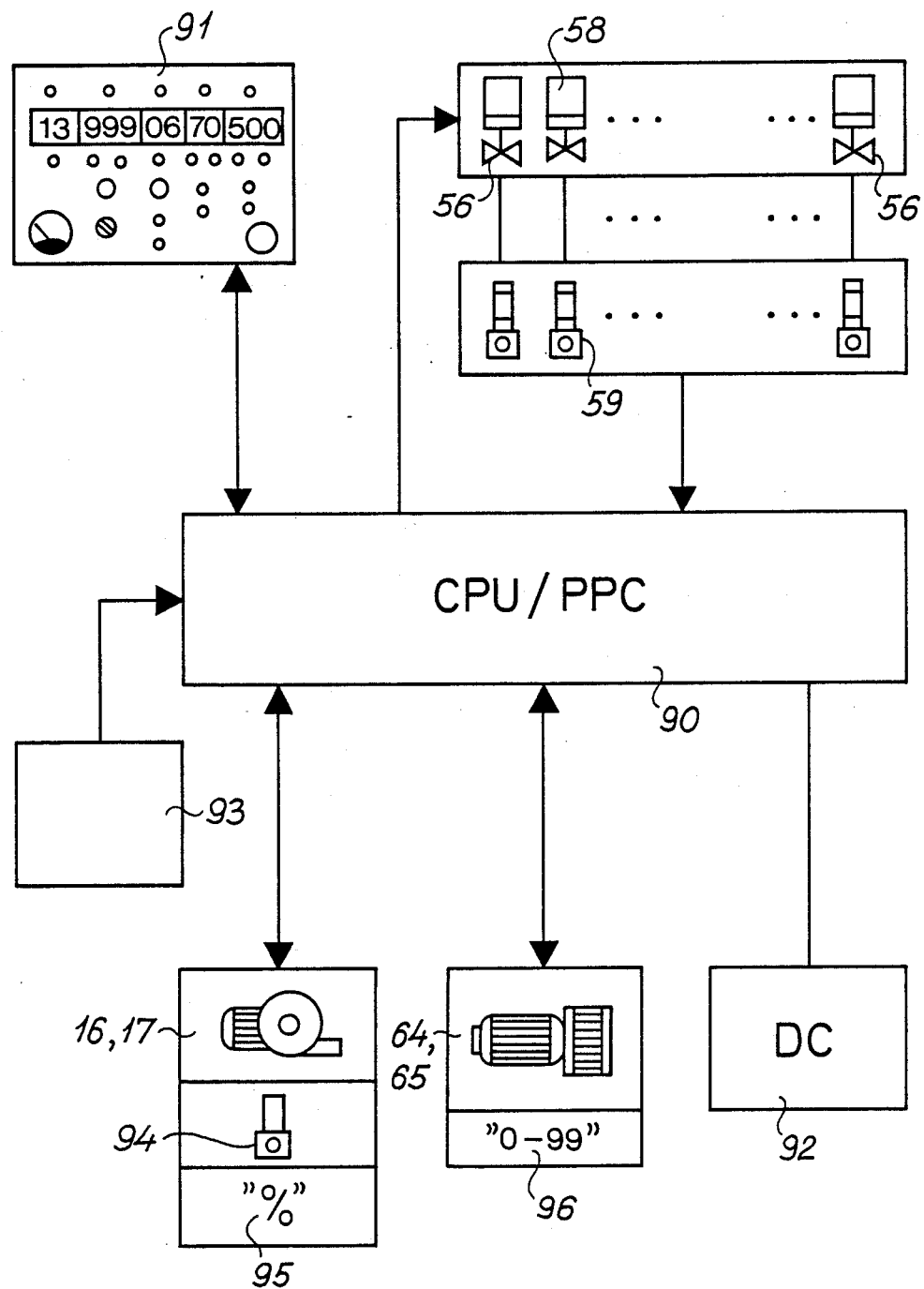
FIG. 6 is a block diagram illustrating the electronic control circuit of the apparatus.

As illustrated in FIG. 6, the operation of the apparatus described above may be controlled by an electronic control circuit or a central processing unit 90 in accordance with any of a plurality of prefixed processing programs. The processing program suitable for a specific type of meat pieces and a specific pattern of arrangement of the meat pieces on the meat supporting surface 11 may be selected by the operator from a control panel 91. The central processing unit 90 controls the operation of the electric motor 17 driving the brine pump 16, of the motor 64 driving the movement of the bridge structure 15 and of the driving bars 72, and of the step motors 58 for setting the throttle valves 56. As illustrated in FIG. 6 the setting of the valves 56 may be adjusted by the unit 90 on the basis of signals received from the pressure sensors or pressure transducers 59. Electrical power is supplied to the apparatus from an electrical power supply 92, and the unit 90 may be programmed by means of a programming block 93.

The electronic control circuit 90 may comprise a CPU (Central Processing Unit)/PPC (Professional Personal Computer). The CPU/PPC, which in the present and preferred embodiment has been implemented in a 4K,32 inputs, 1×8 bit analogue input, and 80 outputs CPU communicating through appropriate input/output and analogue interface blocks which are not shown on the drawings, communicates with the control panel 91 also shown in FIG. 1. The control panel 91 renders it possible for an operator to control the operation of the entire apparatus in the manner described above by manually inputting orders by means of control panel keys or by addressing specific programmes to be executed in the CPU of the apparatus. The programmes of the CPU are input to the GPU through the programming block 93. The programming block may be implemented in any appropriate manner by disk or tape reading means, keyboard means etc., or may be constituted by an input-/output port to an external data system. As mentioned above, the operation of the step motor 58 is controlled in response to control signals generated by the pressure sensors 59 and supplied to the CPU/PPC 90. The operation of the motor 17 driving the pumps 16 is further controlled by the CPU/PPC 90 which receives a control signal in response to the operation of the pump 16 from a pressure transducer 94 so as to operate the pump in accordance with the pressure rate setting which is symbolized by the symbol "%" designated 95 in FIG. 6. The CPU/PPC 90 also controls the operation of the driving motor 64 from which the CPU/PPG further receives a control signal in response to the operation of the driving motor so that in a closed control loop the CPU/PPC controls the operation of the driving motor in accordance with the required setting "0-99" designated the reference numeral 96. As it is evident from FIG. 6, the CPU/PPC communicates with the above-described components of the apparatus in feed-back or closed loops.

We claim:

1. An apparatus for injecting liquid into pieces of food and comprising an arrangement of hollow needles divided into groups, means for moving said pieces of food and said arrangement of needles in relation to each other along a path of movement, means for moving said hollow needles into and out of penetrating engagement with said pieces of food, supply means for supplying pressurized liquid to said needles while they are in engagement with said pieces of food, said supply means comprising a common pressurized liquid source for supplying pressurized liquid to said groups of needles, and control means for controlling the amount of liquid supplied to each group of needles, said control means including pressure reducing means for independently reducing the pressure at which the liquid is supplied to each of said needle groups, whereby different amounts of liquid may be injected into various zones of each piece of food so as to obtain a substantially uniform final liquid distribution in each piece of food.

2. An apparatus according to claim 1, wherein said groups of needles are juxtaposed across said path of movement.

3. An apparatus according to claim 1, wherein said pressure reducing means comprises a pressure control valve associated with each of said groups of needles.

4. An apparatus according to claim 1, wherein the control means comprises an electronic control device for controlling the supply of liquid to the various groups of needles in accordance with a selected program.

5. An apparatus according to claim 4, wherein the control means further comprises a pressure sensor associated with each needle group for sensing the actual pressure of the liquid supplied to the various groups of needles and for transmitting a corresponding sensing signal to the electronic control device which is adapted to adjust the pressure of the liquid supplied to the respective groups in response to the sensing signals received.

6. An apparatus according to claim 1, further comprising a closure valve associated with each group of needles for opening and closing liquid supply to said group of needles when they are moved into and out of engagement, respectively, with a piece of food.

7. An apparatus according to claim 6, wherein said closure valve comprises venting means for separating entrained gas from the liquid supplied to the respective group of needles.

8. An apparatus according to claim 6, wherein each group of needles comprises an abutment member which is moved together with the needles by said moving means, the abutment member being further movable in relation to and along the needles from the free ends thereof against an oppositely directed spring bias so as to facilitate disengagement of said needles from a piece of food.

9. An apparatus according to claim 8, wherein the abutment member is interconnected with the closure valve so as to open the valve when the free end portions of the needles are in a first position in relation to the abutment member, and so as to close the valve when the free ends of the needles are in a second position in relation to the abutment member.

10. An apparatus according to claim 1, wherein the needles are mounted on a common supporting member defining upper surface parts and through holes therein for receiving said needles, an inlet end of each needle comprising a radially extending flange portion engaging with one of said upper surface parts, while a pointed outlet end of the needle extends from the opposite side of the supporting member, and the flange portions of the needles in each group of needles being clamped between one of the upper surface parts and a liquid distributing member for distributing liquid to the various needles of the group.

11. An apparatus according to claim 10, further comprising a closure valve mounted in said distributing member.

12. An apparatus according to claim 10, further comprising a liquid supply conduit for supplying liquid to said group of needles opens into said upper surface part.

13. An apparatus according to claim 10, wherein a plurality of liquid distributing members for a corresponding number of needle groups are pressed into sealing engagement with the inlet ends of the needles of the groups by means of a common releasable pressure member.

* * * * *